United States Patent [19]

Boschetti

[11] 4,452,916

[45] Jun. 5, 1984

[54] HYDROPHILIC COPOLYMERS BASED ON N-[TRIS(HYDROXYMETHYL)METHYL]-ACRYLAMIDE, PROCESSES FOR THEIR PREPARATION, AQUEOUS GELS OF SAID COPOLYMERS AND THEIR USE AS ION EXCHANGERS

[75] Inventor: Egisto Boschetti, Chatou, France

[73] Assignee: Pharmindustrie, Gennevilliers, France

[21] Appl. No.: 415,961

[22] Filed: Sep. 8, 1982

Related U.S. Application Data

[63] Continuation of Ser. No. 258,130, Apr. 27, 1981, abandoned.

[30] Foreign Application Priority Data

May 9, 1980 [FR] France .............................. 80 10382

[51] Int. Cl.$^3$ .................... C08F 220/58; B01D 15/00; C08L 5/00; C08L 89/00
[52] U.S. Cl. ..................................... 521/38; 526/240; 526/258; 526/259; 526/287; 526/288; 526/286; 526/304; 526/285
[58] Field of Search .................. 521/38; 526/310, 304

[56] References Cited

U.S. PATENT DOCUMENTS

| | | | |
|---|---|---|---|
| 3,700,635 | 10/1972 | Brust et al. | 526/304 |
| 3,886,125 | 5/1975 | Chromecek | 526/310 |
| 4,192,784 | 3/1980 | Brown et al. | 526/310 |

FOREIGN PATENT DOCUMENTS

| | | | |
|---|---|---|---|
| 40124 | 11/1981 | European Pat. Off. | 526/304 |
| 2378808 | 7/1977 | France . | |

*Primary Examiner*—Joseph L. Schofer
*Assistant Examiner*—Peter F. Kulkosky
*Attorney, Agent, or Firm*—Beveridge, DeGrandi & Kline

[57] ABSTRACT

Tridimensional cross-linked random copolymers, insoluble in water, containing in copolymerized form: (a) 25% to 98% by weight of N-[tris(hydroxymethyl)methyl]acrylamide or N-[tris(hydroxymethyl)methyl]methacrylamide, or a mixture of these two compounds. (b) 2% to 50% by weight of one or more monomers containing two or several polymerizable ethylenic double bonds and free from anionic or cationic functional groups, and (c) 0.1% to 50% by weight of one or more monomers containing a polymerizable ethylenic double bond and one or more mono- or di-substituted amino, pyrimidinyl, guanidyl, purinyl, quaternary ammonium, SO$_3$H or SO$_3$M groups, M being an alkali metal. These copolymers are utilizable, in the form of aqueous gels, as ion exchangers.

12 Claims, No Drawings

HYDROPHILIC COPOLYMERS BASED ON N-[TRIS(HYDROXYMETHYL)METHYL]-ACRYLAMIDE, PROCESSES FOR THEIR PREPARATION, AQUEOUS GELS OF SAID COPOLYMERS AND THEIR USE AS ION EXCHANGERS

This is a continuation of application Ser. No. 258,130, filed Apr. 27, 1981, and now abandoned.

The present invention relates to new hydrophilic copolymers based on N-[tris(hydroxymethyl)methyl]-acrylamide, which may be used, in the form of aqueous gels, in processes for separating natural or synthetic substances by ion exchange. The invention also relates to processes for the preparation of said copolymers.

Hydrophilic copolymers of N-[tris(hydroxymethyl)-methyl]-acrylamide and a monomer, hydroxylated or not, containing several polymerizable ethylenic double bonds (cross-linking agents) are already known (cf. Tetrahedron Letters No. 6, 1975, p. 357–358; French Pat. No. 2,378,808). These copolymers may be used, in the form of aqueous gels, as supports for gel permeation chromatography and in the techniques of immobilization of natural substances.

It is also known (cf. French Pat. No. 2,260,597) to convert gels of non-ionic hydrophilic polymers of the poly(hydroxyacrylate) or poly(hydroxymethacrylate) type into anionic exchangers by replacement of a part of the hydroxyl radicals of said polymers by radicals containing a cationic functional group, the said replacement being effected by reacting a compound containing a group reactive towards the hydroxyl radicals and a cationic functional group with the gels of hydrophilic polymers.

The hydrophilic copolymers according to the invention are three-dimensional cross-linked random copolymers, insoluble in water, containing in copolymerized form:

(a) 25% to 98% by weight of N-[tris(hydroxymethyl)methyl]-acrylamide or N-[tris(hydroxymethyl)methyl]-methacrylamide, or a mixture of these two compounds, (b) 2% to 50% by weight of one or more monomers containing two or several polymerizable ethylenic double bonds and free from anionic or cationic functional groups, and (c) 0.1% to 50% by weight of one or more monomers containing a polymerizable ethylenic double bond and one or more anionic or cationic functional groups selected from monosubstituted amino, disubstituted amino, pyrimidinyl, guanidyl and purinyl groups, which may be salified or not, the quaternary ammonium groups and SO₃H and SO₃M groups, M indicating an alkali metal.

The copolymers according to the invention preferably contain 0.2% to 15% by weight of monomers (c).

As monomers (b) (cross-linking monomers) may be particularly mentioned the diesters of glycols and acrylic or methacrylic acids, for example ethylene glycol diacrylate and ethylene glycol dimethacrylate, the alkylidene-bis-acrylamides or -methacrylamides, and the compounds of the formula:

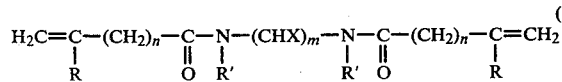
(I)

-continued
or

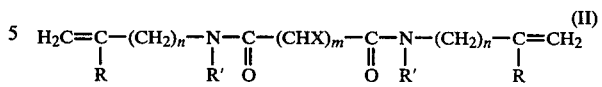
(II)

in which R is a hydrogen atom or a methyl group, R' is a hydrogen atom or a hydroxymethyl group, X is a hydrogen atom or an OH group, n and m are whole numbers from 0 to 6.

In the copolymers according to the invention, the monomers (b) preferably correspond to one of the formulae (I) and (II) above. As examples of these monomers (b) may be mentioned particularly N,N'-methylene-bis-acrylamide, N,N'-ethylene-bis-methacrylamide, hexamethylene-bis-acrylamide, N,N'-diallyl-tartradiamide, glyoxal-bis-acrylamide (or N,N'-dihydroxyethylene-bis-acrylamide) and N,N'-methylene-bis-hydroxymethyl-acrylamide.

As monomers (c) may be specially mentioned the compounds of the formula:

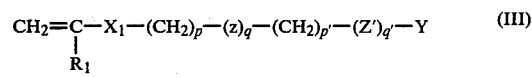
(III)

in which $R_1$ is a hydrogen atom, an alkyl group containing 1 to 4 carbon atoms, especially a methyl group, an SO₃H group or an SO₃M group, M indicating an alkali metal, $X_1$ is a single bond, an oxygen atom or a group —CH₂—,

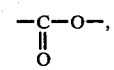

—SO—, —SO₂— or p-phenylene, p, p', q and q' are whole numbers from 0 to 4, Z and Z' are oxygen or sulfur atoms or

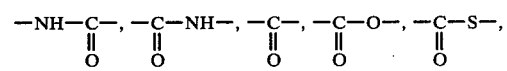

—SO—, —SO₂—, —CH=N—, —NH—SO₂—, —CHOH—, —C≡C— or

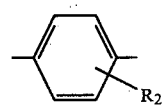

groups, $R_2$ indicating a hydrogen atom or a methyl or methoxy group, and Y representing a monosubstituted amino, disubstituted amino, pyrimidinyl, guanidyl or purinyl group, which is salified or not, a quaternary ammonium group, an SO₃H group or a SO₃M group, M being an alkali metal.

As examples of monosubstituted or disbustituted amino groups, salified or not, represented by Y may be particularly mentioned the groups of the formulae:

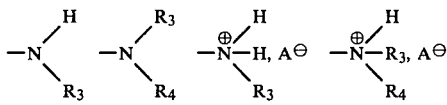

in which $R_3$ and $R_4$ are alkyl groups having 1 to 3 carbon atoms and $A^\ominus$ is the chloride, bromide or iodide anion.

Particular examples of quaternary ammonium groups represented by Y are the groups of formula:

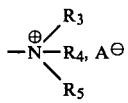

in which $R_3$, $R_4$ and $R_5$ are alkyl groups having 1 to 3 carbon atoms and $A^\ominus$ is the chloride, bromide or iodide anion.

As examples of compounds of formula (III) may be mentioned, without this enumeration having a limitative character, the following compounds:
vinylsulfonic acid and its alkaline salts;
diethylaminoethyl methacrylate and acrylate and their hydrochlorides;
dimethylaminoethyl methacrylate and acrylate and their hydrochlorides;
N-(diethylaminoethyl) acrylamide and N-(dimethylaminopropyl) acrylamide and their hydrochlorides;
[(3-methacrylamido)propyl]trimethylammonium chloride; and
[(3-methylacryloyloxy)propyl]trimethylammonium chloride.

The cross-linked hydrophilic copolymers according to the invention may be prepared, according to known processes, by free-radical polymerization of the monomers (a), (b) and (c). The polymerization may in particular be effected in aqueous solutions, at a temperature from 0° C. to 100° C., preferably from 40° C. to 60° C., and in the presence of the initiators usually used in free-radical polymerization. Examples of such are the redox systems like N,N,N',N'-tetramethylethylenediamine (TEMED)+alkali metal persulfate, or dimethylaminopropionitrile+alkali metal persulfate, organic peroxides such as benzoyl peroxide, and 2,2'-azo-bis-isobutyronitrile. The total concentration of monomers (that is the concentration of monomers (a)+(b)+(c)) in the aqueous solutions subjected to the polymerization is most often between 20 g/l and 400 g/l.

The polymerization may be a block polymerization or an emulsion polymerization. In the case of the block polymerization, the aqueous solution containing the various monomers and the initiator is subjected to a polymerization in homogeneous phase. The block of aqueous gel obtained is then fractionated in grains, for example by passage through the meshes of a sieve.

The emulsion polymerization, which is the preferred method of preparation since it provides directly the aqueous gel in the form of spherical granules of determined size, may be effected as follows:

The aqueous solution containing the various monomers is poured slowly into an organic liquid phase, immiscible with water, maintained in agitation and possibly containing an emulsifying agent. The speed of stirring is regulated so as to obtain an emulsion of the aqueous phase in the organic phase having the desired size of droplets. The control of this size, therefore the regulation of the stirring, is effected by examination under the microscope of samples taken from the emulsion. Once the stirring speed is regulated, the initiator is introduced into the emulsion, which starts the polymerization. The latter is continued to its end while keeping the same stirring conditions. The beads of aqueous gel thus obtained are washed with a solvent or a surface-active substance so as to remove therefrom traces of organic phase, then with water.

Examples of liquid organic phase utilizable are vegetable oils, (soya oil, peanut oil, sunflower seed oil, etc.) or mineral oils (paraffin oil, silicone oil), the products of fractional distillation of petroleum (benzene, toluene, etc.), chlorinated hydrocarbons (carbon tetrachloride, methylene chloride, etc.) and mixtures of these various compounds. The liquid organic phase may possibly contain an emulsifier like the products known by the commercial names "Span", "Arlacel" or "Tween", at a concentration of 0.1% to 4% by volume.

The beads of aqueous gel obtained by the process of emulsion polymerization have a particle diameter which varies according to the operational conditions, from 1 $\mu$m to 600 $\mu$m. Preferably the diameter of the particles is between 40 $\mu$m and 80 $\mu$m.

The aqueous gels obtained by one of the processes described above can be kept in suspension in water or in an aqueous buffer solution, in the presence of traces of a bacteriostatic substance such as, for example, sodium azide. A concentration of 0.02% of sodium azide is sufficient to ensure their preservation.

The aqueous gels can also be dried by conventional methods (lyophilization, treatment by an organic solvent miscible with water, etc.). Copolymers are thus obtained in the form of a white powder, rehydratable at the moment of use. The rehydration is effected by mere contact with water or an aqueous buffer solution. The powders of copolymers represent a form very convenient for storage since they occupy a very small volume and can be kept indefinitely, without addition of preservatives and bacteriostatics.

The aqueous gels may contain 2% to 60% by weight of copolymer according to the invention, the remainder consisting of water of hydration.

The copolymers according to the invention can be used advantageously, in the form of aqueous gels, as ion exchangers for the separation of the proteins, in particular the proteins of the serum, the polynucleotides and the synthetical nucleotides.

The following examples illustrate the invention without it being restricted thereto.

EXAMPLE 1

350 ml of paraffin oil and 2 ml of the emulsifier known by the trade name "Span 80" (non-ionic surface-active substance consisting of esters of fatty acid and sorbitan) are introduced into a 700 ml reactor. The mixture is mechanically stirred and heated at 55° C. In addition, 60 g of N-[tris-(hydroxymethyl)-methyl]-acrylamide, 8 g of N,N'-methylene-bis-hydroxymethyl-acrylamide and 12 g of [(3-methacrylamido)-propyl]-trimethylammonium chloride are dissolved in 200 ml of demineralized water heated at 55° C. and 300 mg of ammonium persulfate are added to this solution. The solution thus obtained is poured into the stirred paraffin oil. The stirring speed is regulated so as to obtain a stable emulsion of which the droplets have a diameter of about 80 μm. At the end of 10 minutes of stirring 0.32 ml of TEMED is introduced into the emulsion and the stirring is continued for a further 30 minutes.

The reaction medium is then cooled by addition of icewater, the stirring is stopped and the mixture is left to stand for several hours. The supernatant oily phase is removed by suction and the beads of gel obtained are recovered by decantation. These beads are washed with a 0.1% aqueous solution of Triton X-100 in order to eliminate the residues of oil, then with demineralized water unitl all the detergent is removed.

Beads are thus obtained, having a mean diameter of 80 μm of an aqueous gel of a copolymer N-[tris(hydroxymethyl)methyl]-acrylamide/N,N'-methylene-bis-hydroxymethyl-acrylamide/[(3-methacrylamido)-propyl]trimethylammonium chloride. These beads have an ion exchange capacity of 200 μeq per ml and can be kept in demineralized water or in a suitable buffer.

EXAMPLE 2

350 ml of paraffin oil and 2 ml of the emulsifier known by the trade name "Arlacel"C" (non-ionic surface-active substance consisting of the esters of fatty acid and sorbitan) are introduced into a 700 ml reactor. The mixture is stirred mechanically and heated to 55° C. In addition, there are dissolved in 200 ml of demineralized water heated to 55° C. 60 g of N-[tris(hydroxymethyl)methyl]acrylamide, 8 g of N,N'-methylene-bis-acrylamide and 12 g of N-(diethylaminoethyl)acrylamide hydrochloride, and 300 ml of ammonium persulfate are added to this solution. The solution thus obtained is poured into the stirred paraffin oil. The stirring speed is regulated so as to obtain a stable emulsion the droplets of which have a diameter of about 80 μm. At the end of the 10 minutes of stirring, 0.32 ml of TEMED is introduced into the emulsion and the stirring is continued for about 30 minutes.

The reaction medium is then cooled by addition of icewater, the stirring is stopped and the mixture is left to stand for several hours. The supernatant oily phase is eliminated by suction and the beads of gel obtained are recovered by decantation. These beads are washed with a 0.1% aqueous solution of Triton X-100 in order to remove the oil residues, then with demineralized water until the detergent is completely eliminated.

Beads having an average diameter of 80 μm of an aqueous gel of a copolymer N-[tris(hydroxymethyl)methyl]acrylamide/N,N'-methylene-bis-acrylamide/N-(diethylaminoethyl)-acrylamide hydrochloride are thus obtained. These beads have an ion exchange capacity of 300 μeq per ml and can be kept in a molar aqueous solution of sodium chloride.

EXAMPLE 3

The beads of aqueous gel obtained in Example 2 are placed, over a height of 0.5 cm, in a column of 2 cm² section. The ion exchange column thus provided is placed in a tris(hydroxymethyl)aminomethane/HCl 0.05 M, pH 8.6, aqueous buffer, then there is introduced at the top of the column the sample containing the substance to be separated. This sample consists of 1 ml of the preceding buffer solution containing in solution 10 mg of each of the four following substances: cytochrome C, haemoglobin, β-lactoglobuline and ovalbumin. The sample is fixed on the column, then eluted with tris(hydroxymethyl)aminomethane/HCl 0.05 M, ph 8.6, buffer solution containing a growing concentration of NaCl (the concentration of NaCl increases from 0 to 0.5 M). The four substances contained in the sample are thus separated.

What is claimed is:

1. Tridimensional cross-linked random copolymers, insoluble in water, containing in copolymerized form:
   (a) 25% to 98% by weight of N-[tris(hydroxymethyl)methyl]acrylamide or N-[tris(hydroxymethyl)methyl]methacrylamide or a mixture of these two compounds;
   (b) 2% to 50% by weight of one or more monomers possessing two or several polymerizable ethylenic double bonds and free of anionic or cationic functional groups; and
   (c) 0.1% to 50% by weight of one or more monomers corresponding to the formula:

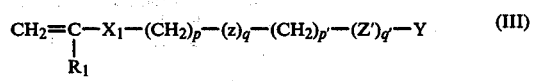

in which $R_1$ is a hydrogen atom, an alkyl group containing 1 to 4 carbon atoms, an $SO_3H$ or an $SO_3M$ group, M indicating an alkali metal, $X_1$ is a single bond, an oxygen atom or a —$CH_2$—,

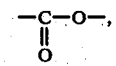

—SO—, —$SO_2$— or p-phenylene group, p, p', q and q' are whole numbers from 0 to 4, Z and Z' are oxygen atoms or sulfur atoms or

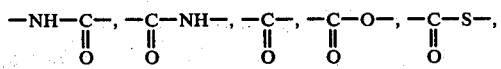

—SO—, —$SO_2$—, —CH=N—, —NH—$SO_2$—, —CHOH—, —C≡C— or

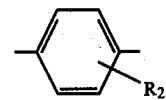

groups, $R_2$ indicating a hydrogen atom or a methyl or methoxy group, and Y represents a monosubstituted amino, disubstituted amino, pyrimidinyl, guanidyl or purinyl group, salified or not, a quaternary ammonium, $SO_3H$ or $SO_3M$ group, M being an alkali metal.

2. Copolymers according to claim 1 which contain in copolymerized form 0.2% to 15% by weight of monomers (c).

3. Copolymers according to claim 2 in which the monomer or monomers (b) correspond to one of the formulae:

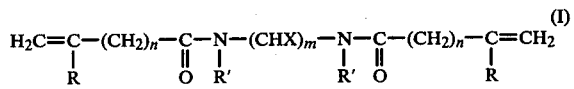

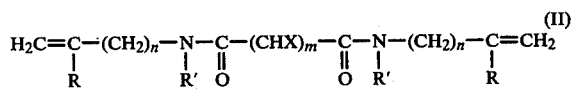

in which R is a hydrogen atom or a methyl group, R' is a hydrogen atom or a hydroxymethyl group, X is a hydrogen atom or an OH group, and n and m are whole numbers from 0 to 6.

4. Copolymers according to claim 1 in which the monomer or monomers (b) correspond to one of the formulae:

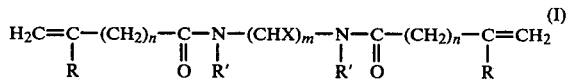

(I)

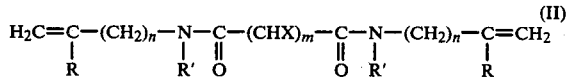

(II)

in which R is a hydrogen atom or a methyl group, R' is a hydrogen atom or a hydroxymethyl group, X is a hydrogen atom or an OH group, and n and m are whole numbers from 0 to 6.

5. Copolymers according to claim 1, 2, 3 or 4 in which the monomer or monomers (c) corresponds or correspond to the formula:

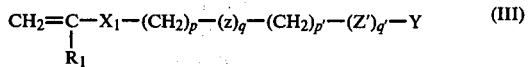

(III)

in which $R_1$ is a hydrogen atom, an alkyl group containing 1 to 4 carbon atoms, an $SO_3H$ or an $SO_3M$ group, M indicating an alkali metal, $X_1$ is a single bond, an oxygen atom or a —$CH_2$—,

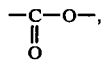

—SO—, —$SO_2$— or p-phenylene group, p, p', q, q' are whole numbers from 0 to 4, Z and Z' are oxygen atoms or sulfur atoms or

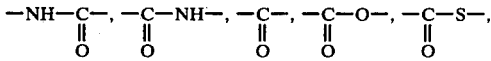

—SO—, —$SO_2$—, —CH=N—, —NH—$SO_2$—, —CHOH—, —C≡C— or

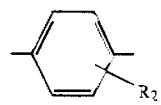

groups, $R_2$ indicating a hydrogen atom or a methyl or methoxy group, and Y represents a monosubstituted amino, disubstituted amino, pyrimidinyl, guanidyl or purinyl group, salified or not, a quaternary ammonium, $SO_3H$ or $SO_3M$ group, M being an alkali metal.

6. Copolymers according to claim 1 in which the monomer or monomers (b) are selected from the group consisting of N,N'-methylene-bis-acrylamide, N,N'-ethylene-bis-methacrylamide and hexamethylene-bis-acrylamide.

7. Copolymers according to claim 5 in which, in formula (III) of monomers (c), Y represents a group

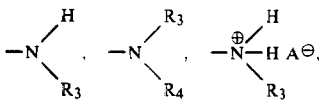

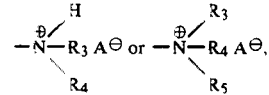

$R_3$, $R_4$ and $R_5$ representing alkyl groups containing 1 to 3 carbon atoms and $A^\ominus$ representing the chloride, bromide or iodide anion.

8. Copolymers according to claim 7, in which the monomer (c) is selected from:
vinylsulfonic acid and its alkali metal salts;
diethylaminoethyl methacrylate and acrylate and their hydrochlorides;
dimethylaminoethyl methacrylate and acrylate and their hydrochlorides;
N-(diethylaminoethyl)acrylamide and N-(dimethylaminopropyl)acrylamide and their hydrochlorides;
[(3-methacrylamido)propyl]trimethylammonium chloride; and
[(3-methacryloyloxy)propyl]trimethylammonium chloride.

9. Aqueous gels which contain 2% to 60% by weight of a copolymer as defined in claim 1.

10. Aqueous gels according to claim 9, which are in the form of beads having a diameter of 1 μm to 600 μm.

11. Aqueous gels according to claim 10, in which the diameter of the beads is between 40 μm and 80 μm.

12. The process which comprises utilizing the gels as defined in claim 9, 10 or 11 in the separation of natural or synthetic substances by ion exchange.

* * * * *